United States Patent Office 3,445,152
Patented May 20, 1969

3,445,152
MICROSCOPE SLIDES AND METHOD OF MANUFACTURING
Stephen Barnaby Carter, Macclesfield, England, assignor to Imperial Chemical Industries Limited, London, England, a corporation of Great Britain
No Drawing. Filed Dec. 13, 1965, Ser. No. 513,578
Claims priority, application Great Britain, Jan. 5, 1965, 429/65
Int. Cl. G02b 21/34
U.S. Cl. 350—95      4 Claims

ABSTRACT OF THE DISCLOSURE

A microscope slide characterized by the provision, on one surface thereof, of barriers which in use serve to restrict or confine cell movement, the barriers being composed of a synthetic resin adhered to the slide. The resin may be, for example, an acrylic resin or polystyrene. A method of making the slide is also disclosed, the method comprising applying, to at least one surface of a slide, a first layer of a synthetic resin to which living cells will not adhere, coating the resin layer with a second layer of a soluble material which can be rendered insoluble by light, projecting an image onto the second layer to render insoluble areas thereof in correspondence with the desired locations of the barriers, treating the silde to remove the remaining soluble areas of the second layer and the corresponding areas of the first layer, and then treating the slide to remove the insoluble areas of the second layer.

---

This invention concerns microscope slides.

In the study of cells, it is desirable, in many instances, to confine living cells within specific areas of a microscope slide for visual examination of the behaviour thereof. This is because the cells cultured on a slide are effectively mobile so that where prolonged studies are concerned there is no certainty that a cell under examination at a particular time will be the same cell as was previously examined or the same as that which will be examined at a later stage in the study.

In other instances it may desirable to confine cells to particular paths, for example to enable research to be made into the behaviour of similar or different cells (e.g. malignant or non-malignant cells) when they encounter one another.

Hitherto, it has not been possible effectively to retain or confine cells in a determined location upon, or guide them in a predetermined path along, a microscope slide as aforesaid. We have now found, however, that restriction of cell movement upon a microscope slide (which term is intended to encompass any thin plate of glass or other transparent material normally employed to retain a specimen in position for examination under a microscope) can be obtained by the provision, on such slide, of effective barriers defining enclosed areas or predetermined paths of movement, said barriers being formed of a synthetic material to which the cells are effectively unable to adhere.

Accordingly, the present invention provides as a first feature a microscope slide characterized by the provision, on one surface thereof, of barriers which in use serve to restrict or confine cell movement, said barriers being composed of a synthetic resin adhered to the slide.

In one practical embodiment of the slide of the invention the barriers are provided by a layer of the resin applied to the slide and having areas thereof removed to expose the surface of the slide, said areas constituting pens or pathways on the slide to which cells will be confined.

In another practical embodiment, the barriers are provided by a layer of resin whereon are provided areas which are metallized to constitute islands or pathways on the resin to which cells can adhere, so as to provide islands or pathways to which cells will be confined.

In a further embodiment the barriers are provided by fibres of the resin adhered to the surface of the slide, e.g. by being melted thereon.

The resin of the barriers may advantageously be an acrylic resin or it may be polystyrene, polycarbonate or Terylene (Trademark).

Particularly suitable is secondary cellulose acetate which may incorporate suitable plasticisers such as triphenyl phosphate and diethyl phthalate. Such resin is substantially colourless so that it does not interfere visually with cell examination and it is particaularly effective in confining the movement of cells.

Where fibres are employed to provide the barriers, they can if desired be adhered to the slide as a random mass so as to provide a random arrangement of barriers defining pens of irregular shape on the slide.

Preferably, however, the barriers are arranged in regular disposition, for example in a parallel arrangement poviding one or more cell-movement paths of substantially constant width, or in a grid arrangement composed of two groups of parallel barriers arranged substantially at right angles to one another to define a regular pattern of pens.

The invention further provides various methods of making a slide provided with barriers as aforesaid.

A first method of preparing a slide in accordance with the invention comprises applying, to at least one surface of a slide, a fist layer of a synthetic resin to which living cells will not adhere, coating said resin layer with a second layer of a soluble material which can be rendered insoluble by light, projecting an image onto the second layer to render insoluble areas thereof in correspondence with the desired locations of the barriers, treating the slide to remove the remaining soluble areas of the second layer and the corresponding areas of the first layer, and then treating the slide to remove the insoluble areas of the second layer.

A second method of preparing the slide comprises applying, to at least one surface of a slide, a first layer of synthetic resin to which living cells will not adhere, then applying over predetermined areas of said first layer, a second layer approximating to atomic thickness, of a non-toxic metal so as to define, on the first layer, islands or pathways to which living cells will adhere, the areas of the first layer not coated with the second layer constituting the barriers.

In a third way of preparing a slide according to the invention a plurality of fibres of a synetic resin to which living cells will not adhere are located in a desired disposition on a slide and are caused to adhere to the slide as cell-confining or restricting barriers by melting said fibres onto the slide.

In order that the invention may be fully understood it will be described further, by way of example, with reference to three different ways of carrying the same into effect, it being understood that the following description is illustrative, and not limitative of, the scope of the invention.

In a first way of preparing a slide according to the invention, use is made of a glass microscope slide element (sometimes known as a "cover glass") intended to be employed in conjunction with a glass plate provided with means for retaining the cover glass in contact with a liquid cell-culture medium. Thus, such glass plate may be provided with a pair of concentric rings cemented to one face thereof and clips for holding the cover glass against the rings, all as described in our co-pending application for Patent No. 430/65 filed simultaneously herewith.

After appropriate cleaning, the cover glass is dipped into a 0.5% w./v. solution of cellulose acetate (acetyl value 54–56%) in 1,4-dioxan and after removal is stood in a vertical disposition in an atmosphere saturated with 1,4-dioxan and dried under vacuum to avoid clouding by atmospheric humidity. This produces, over the whole of the cover glass, a very thin first layer of cellulose acetate. The adherence of this layer is improved substantially by heating the treated cover glass to about 280° C. for 10 seconds.

To one surface of the cover glass there is now applied, e.g., by painting on or by other suitable techniques, a second layer composed of gelatine or fish glue admixed with potassium dichromate or ammonium dichromate, which is normally soluble in water but can be rendered insoluble by subjecting it to light.

The cover glass is now placed into suitable optical apparatus and an image is projected thereon, using a glass or other transparency whereon the desired barrier dispositions are represented in negative. Thus, where grid-form barriers composed of two series of parallel strip-like barriers, with the barriers of the two series intersecting one another at right angles to define between them substantially rectangular areas or pens, are required, the transparency will bear opaque areas corresponding to the pens and will be transparent between such areas. The image can, of course, be focussed very accurately, and by use of an appropriate lens system it can be produced accurately at any desired magnitude, e.g. with the images of the rectangular areas having dimensions of the order of $50\mu \times 90\mu$ on the cover glass.

In the areas where light strikes, i.e. corresponding to the desired dispositions of the barriers, the gelatine or fish glue is rendered insoluble, whilst the areas on which no light is impinged remain soluble in water.

After being subjected to the image as just described, the cover glass is washed with water to remove the still soluble gelatine or fish glue, to expose corresponding areas of the first layer, i.e. the layer of cellulose acetate. Thereupon, it is treated with a suitable solvent such as acetone, tetrahydrofuran or 1,4-dioxan to wash away such exposed cellulose acetate, as well as any of the first layer which was not coated with the gelatine or fish glue layer, e.g. the cellulose acetate on the other surface of the cover glass. This leaves the cover glass the cellulose acetate adhered thereto only over the areas of one surface thereof corresponding to those areas which were subjected to light, this cellulose acetate having its protective layer of insoluble gelatine or fish glue, removal of the latter insoluble layer is then effected, for example, by digesting with a protein splitting enzyme, such as trypsin.

The resultant cover glass accordingly has, on one surface thereof, a cellulose acetate grid composed of very narrow lines of the acetate in two parallel series intersecting one another at right angles, and defining between them areas or pens, the glass having been exposed in correspondence with such areas or pens by removal of corresponding areas of the cellulose acetate.

If such cover glass is now used in cell study and cells are cultured thereon on the side whereon the grid is provided, the cells tend to be confined by the grid, the cellulose acetate lines effectively acting as barriers preventing movement of the cells from the areas are pens in which they are originally cultivated. Depending upon the spacing of the pens and the number of cells introduced it is found that many of the individual areas or pens of the grid will, upon initial culturing of cells on the cover plate, be occupied each by only one cell and the behaviour of such cell over prolonged periods of time can be supervised with certainty. The grid accordingly serves effectively to confine the cells to pens wherein they can readily be subjected to examination and positive re-examination, in a particularly convenient manner.

It is to be understood, of course, that during and after culture the cells will be maintained in contact with a liquid culture medium and for this reason the cover glass will be employed as part of a microscope slide arrangement such as is described in our aforementioned co-pending application.

In a second way of preparing a slide according to the invention, the cover glass is dipped into a cellulose acetate solution, dried and heated to about 280° C. for 10 seconds as described in the foregoing example to produce a first layer thereon. However, instead of then treating such acetate layer to remove parts thereof to expose regions of the cover glass to constitute pens, areas of the layer are treated to render them of such a nature that living cells can adhere thereto.

This is done by appropriately arranging the cover glass in a vacuum vessel in an appropriate location relative to a minute quantity of gold or palladium disposed upon a support such as a molybdenum strip adapted to be heated electrically to sufficient temperature to vapourise the metal when under vacuum, with the interposition between the cover glass and the metal of a suitable mask such as a metal grid of the type used for supporting specimens in electron microscopy. The vessel is then evacuated, for example to an absolute pressure of $10^{-4}$ mm. of mercury, and the support is heated. As a result, a layer of the metal (i.e. gold or palladium) the thickness of which approximates to atomic thickness is applied to the cover glass. In that region of the cover glass shielded by the mask or grid, only those parts of the cover glass corresponding to apertures in the mask or grid will be coated, so that uncoated areas corresponding to the physical shape and dimensions of the mask or grid will remain.

Assuming the mask or grid to provide substantially rectangular apertures in rows and columns and the side length of each aperture to be, for example, of the order of $40\mu$ to $90\mu$, then corresponding rectangular areas of the slide will have been metallised, and such areas can be likened to islands each formed by a metal layer of infinitesimal thickness on the acetate layer.

Living cells will adhere to the metallised surfaces but not to the exposed acetate surfaces, so that when the cover glass is used in cell culture experimentation as already described in relation to the first example, the cells are confined on the "islands" of the metal layer and are apparently unable to traverse the barriers, between the "islands" provided by the cellulose acetate. The metal layer approximating to atomic thickness, does not interfere with visual examination of cells on the slide.

In a third way of carrying the invention into effect, barriers are applied to a cover glass as cellulose acetate fibres and are caused to adhere thereto to define the desired cell-retaining areas or pens on the cover glass.

This is done by winding a fine drawn cellulose acetate fibre (e.g. of cellulose acetate compounded with triphenyl phosphate and diethyl phthalate as plasticiser and of 1.8 denier or less) upon an appropriate former (a small lead pellet secured to each of the fibre facilitating the handling thereof), applying the former to the cover glass and subjecting the assembly to heat so that part of each turn of the fibre on the former is melted onto and becomes adhered to the cover glass. This produces a first series of substantially parallel barriers and for producing a grid, the steps just described are repeated to produce a second series of barriers on the slide substantially at right angles to and intersecting those of the first series.

The resultant slide can be used in cell culture experimentation in exactly the same ways as the two previously described examples.

The reason why the resin acts as an effective barrier to the cells is not fully investigated. In the foregoing, we have assumed that the reason is that the living cells will readily adhere to glass or to the metallised areas of the resin but will not adhere to the resin itself. Consequently the cells would experience difficulty in moving over the resin fibres or the exposed resin. Thus when the slide is in contact with a cell culture medium and has the prepared surface facing downwards, cells fall away from the non-adherent areas, but remain upon and move about the areas which are cell adherent. Further, it has been found that cells will not move from the areas which are cell adherent and cross areas which are non-adherent. Our observations would indicate that this explanation is true, but there may be some other reason why the resin tends to confine the living cells.

In experiments we have found that secondary cellulose acetate forms particularly effective barriers and cultured cells will apparently not pass thereover. Other synthetic materials such as polystyrene, polycarbonate and Terylene (Trademark) as well as acrylic resin fibres are also effective to a greater or lesser degree.

As previously stated, it is also contemplated that within the scope of the present invention variations may be made thereto. For instance, in a very simple example two barriers, e.g. acetate fibres, can be employed on a slide to provide a single path along which cells are constrained to move, and this would permit research into the behaviour of like or dissimilar cells upon encountering one another.

Whilst regular grid-like arrangement is desirable when the barriers employed to define discrete cell-retaining areas on a slide, it is not essential to the invention that the barriers should be so arranged, and randomly distributed barriers on a slide will effectively produce a number of defined cell-retaining areas or pens, so that cells cultured in any of such areas can, of course, readily be identified.

What I claim is:

1. A microscope slide adapted to confine minute living cells within a predetermined area of the slide in any orientation of said slide for microscopic examination, said slide comprising a glass microscope slide element one face of which is intended for contact with a liquid cell-culture medium, said face having in certain discrete surface areas a layer of synthetic resin thereon to which said living cells will not adhere and provided with a plurality of certain other discrete surface areas comprising material to which said cells will adhere, the non-adherent portion of said face providing barriers which restrict and confine movement of said cells to said areas wherein the cells will adhere to said face.

2. A microscope slide as claimed in claim 1 wherein said certain other discrete areas where the cells adhere comprise a cell-adherent metal coating on said resin.

3. A microscope slide, as claimed in claim 1, wherein the resin is an acrylic resin, polystyrene, polycarbonate or polyester.

Method for the manufacture of a microscope slide, which comprises applying, to at least one surface of a slide, a first layer of a synthetic resin to which living cells will not adhere, coating said resin layer with a second layer of a soluble material which can be rendered insoluble by light, projecting an image onto the second layer to render insoluble areas thereof in correspondence with the desired locations of the barriers, treating the slide to remove the remaining soluble areas of the second layer and the corresponding areas of the first layer, and then treating the slide to remove the insoluble areas of the second layer.

References Cited

UNITED STATES PATENTS

| 2,302,830 | 11/1942 | Axel Rad | 350—95 |
| 3,005,375 | 10/1961 | Sherman | 350—95 |
| 3,198,064 | 8/1965 | Moore | 350—95 |
| 3,307,036 | 2/1967 | Bouvelle | 350—95 |

FOREIGN PATENTS

| 551,450 | 1/1958 | Canada. |

OTHER REFERENCES

Beck, "The Microscope," page 55, 1921 QIT.205.B4.

DAVID SCHONBERG, *Primary Examiner.*

PAUL R. GILLIAM, *Assistant Examiner.*